United States Patent
Oscarson et al.

(10) Patent No.: US 11,452,951 B2
(45) Date of Patent: Sep. 27, 2022

(54) DISPOSABLE FILTER UNIT FOR A SYSTEM ALLOWING FOR PURIFICATION AND RECYCLING OF WATER OR SEPARATION OF WATER

(71) Applicant: ORBITAL SYSTEMS AB, Malmö (SE)

(72) Inventors: Joakim Oscarson, Vejbystrand (SE); Richard Boden, Malmö (SE)

(73) Assignee: ORBITAL SYSTEMS AB, Malmo (SE)

( * ) Notice: Subject to any disclaimer, the term of this patent is extended or adjusted under 35 U.S.C. 154(b) by 284 days.

(21) Appl. No.: 16/462,855

(22) PCT Filed: Nov. 22, 2017

(86) PCT No.: PCT/SE2017/051156
§ 371 (c)(1),
(2) Date: May 21, 2019

(87) PCT Pub. No.: WO2018/097787
PCT Pub. Date: May 31, 2018

(65) Prior Publication Data
US 2019/0275449 A1    Sep. 12, 2019

(30) Foreign Application Priority Data

Nov. 25, 2016 (SE) .................. 1651549-6

(51) Int. Cl.
*B01D 27/14* (2006.01)
*B01D 27/08* (2006.01)
(Continued)

(52) U.S. Cl.
CPC .......... *B01D 27/146* (2013.01); *B01D 27/08* (2013.01); *B01D 35/02* (2013.01); *C02F 9/00* (2013.01);
(Continued)

(58) Field of Classification Search
CPC ...... B01D 27/146; B01D 27/08; B01D 27/00; B01D 27/14; B01D 35/02;
(Continued)

(56) References Cited

U.S. PATENT DOCUMENTS 5,147,532 A * 9/1992 Leek, Jr. ................. C02F 1/325
210/97
5,192,427 A    3/1993 Eger et al.
(Continued)

FOREIGN PATENT DOCUMENTS

CN    104556271 A    4/2015
EP    2559668 A1 * 2/2013 .............. C02F 9/005
(Continued)

OTHER PUBLICATIONS

EP 2559668 A1 English description, Feb. 2013, Heilmaier Marion.*
(Continued)

*Primary Examiner* — Akash K Varma
(74) *Attorney, Agent, or Firm* — Moser Taboada

(57) ABSTRACT

The present invention describes a disposable filter unit (1) intended for a system (10) allowing for purification and recycling of water or separation of water, said disposable filter unit (1) comprising an outer body (2), a top (3), a bottom (4), an inflow (5), an outflow (6) and a filter means (7) enclosed in the outer body (2), wherein the inflow (5) is positioned adjacent to the bottom (4) and the outflow (6) is positioned adjacent to the top (3), and wherein the inflow (5) and (10) outflow (6) are arranged to be fixated simultaneously into the system (10) and released simultaneously from the system (10) enabling a simple replacing of the disposable filter unit (1) for a user, and wherein the system (10) comprises a mechanical filter fixating/releasing unit (8).

21 Claims, 4 Drawing Sheets

(51) Int. Cl.
*C02F 9/00* (2006.01)
*B01D 35/02* (2006.01)
*C02F 1/00* (2006.01)
*C02F 1/32* (2006.01)
*E03B 1/04* (2006.01)

(52) U.S. Cl.
CPC ...... *B01D 2201/4084* (2013.01); *C02F 1/001* (2013.01); *C02F 1/32* (2013.01); *C02F 2209/42* (2013.01); *E03B 1/042* (2013.01); *E03B 2001/045* (2013.01)

(58) Field of Classification Search
CPC .... B01D 2201/4084; C02F 9/00; C02F 1/001; C02F 1/32; C02F 1/00; C02F 2209/42; E03B 1/042; E03B 1/04; E03B 1/02; E03B 2001/045; A47K 3/28; E03C 1/00
USPC ...................................... 210/748.1
See application file for complete search history.

(56) References Cited

U.S. PATENT DOCUMENTS 5,709,795 A 1/1998 Park et al.
2003/0189002 A1* 10/2003 Proulx ................... E03B 7/074
210/284

FOREIGN PATENT DOCUMENTS

JP         2001107428 A      4/2001
KR         20160053225 A     5/2016
WO         WO-2016/144235 A1 9/2016

OTHER PUBLICATIONS

Swedish Search Report for patent application No. 1651549-6, dated Apr. 27, 2017.
International Search Report for Application PCT/SE2017/051156, dated Mar. 19, 2018.

* cited by examiner

DISPOSABLE FILTER UNIT FOR A SYSTEM ALLOWING FOR PURIFICATION AND RECYCLING OF WATER OR SEPARATION OF WATER

FIELD OF THE INVENTION

The present invention relates to a disposable filter unit intended for a system allowing for purification and recycling of water.

TECHNICAL BACKGROUND

There are existing filters for systems intended for purification and recycling of water or separation of water.

One system intended for recirculation of water and where a filter is involved is disclosed in U.S. Pat. No. 9,074,355. U.S. Pat. No. 9,074,355 is directed to a domestic water recycling system comprising an optical detector to detect certain smaller sized (non-filtered) contaminants and a filter to remove larger sized (filtered) contaminants.

Yet another a system involving also filter(s) is disclosed in WO2013/095278 which describes a hybrid device for a recirculation shower comprising a filter system with a nano-filter.

Furthermore, to give yet another example of a filter which may be intended for systems there is one such disclosed in WO2016/144235. In WO2016/144235 there is described a capsule comprising an inner casing, an outer unit which has means having a pressure up-taking ability for the inner casing, where the inner casing and outer unit may be totally separated from each other.

The present invention is directed to providing an optimized disposable filter unit intended for systems allowing for purification and recycling of water or separation of water.

SUMMARY OF THE INVENTION

The latter stated purpose above is achieved by a disposable filter unit intended for a system allowing for purification and recycling of water or separation of water, where the disposable filter unit comprises an outer body, a top, a bottom, an inflow, an outflow and a filter means enclosed in the outer body, wherein the inflow is positioned adjacent to the bottom and the outflow is positioned adjacent to the top, and where the inflow and outflow are arranged to be fixated simultaneously into the system and released simultaneously from the system enabling a simple replacing of the disposable filter unit for a user, and wherein the system comprises a mechanical filter fixating/releasing unit. In relation to the above it should be said that the expression "system" relates to any type of system allowing for purification and recycling of water or separation of water, such as e.g. a shower, sink, washing machine or the like. Furthermore, the expression "system" relates to the entire system, and it should be noted that there may be many different parts of the system. To give one example in relation to the disposable filter unit according to the present invention, the docking unit may be mentioned. This is a part of the system and is also a part interacting directly with the disposable filter unit according to the present invention enabling to fixating and releasing the disposable filter unit from the system.

Furthermore, in relation to the expression purification, this purification may involve active treatment of the water, such as e.g. a light treatment, e.g. UV, but also more passive treatment in the form of filtration.

The disposable filter unit according to the present invention has several advantages. First of all, the inflow and outflow are arranged to be fixated simultaneously into the system, such as into a docking station, and released simultaneously from the same enabling a simple replacing of the disposable filter unit. This is one beneficial property for a disposable filter unit.

Secondly, the arrangement of the inflow being positioned adjacent to the bottom and the outflow being positioned adjacent to the top also have clear advantages. As the disposable filter unit may be arranged in the system in a vertical direction with the top in a highest position of the disposable filter unit in the system, such a vertical positioning of the disposable filter unit enables back-flushing of the filter unit by draining water in the system from the top to the bottom by using gravity. Moreover, such a draining of the filter unit also implies that the cleaning is performed from a cleaner part of the filter unit to a dirtier side thereof, which also is beneficial. Repeated filling and draining enables a cleaning cycle which, if needed, can be made more potent using a chemical solution.

Furthermore, when filling the system is performed from bottom to top, then air in the system is transported the same direction. As such, there is no need to ventilate the system and there is minimal risk for air pockets.

The above features further show the clear differences when comparing the present invention with e.g. the filter according to WO2016/144235.

Furthermore, the mechanical filter fixating/releasing unit may be of any type available. One example is shown in FIGS. 2 and 3, however also very different alternatives are possible. To give another example, the mechanical filter fixating/releasing unit may be a cover placed over at least part of the outer body of the filter unit. This cover then ensures to hold the filter securely in place. When the filter unit is to be replaced, then the cover is simply opened so that the filter unit can be replaced. Such a cover, when being locked, also ensures that the inflow and outflow are arranged to be fixated simultaneously into the system according to the present invention. The same is valid for the alternative of the mechanical filter fixating/releasing unit shown in FIGS. 2 and 3. Therefore, this unit is of interest to ensure the fixating and releasing, in a simultaneous fashion, of the inflow and outflow into the system, and hence is of interest to increase the utility as a disposable filter for a user.

There are existing filter units which have the inflow in the bottom and the outflow in the top. One such is disclosed in US20030189002, however the filter unit disclosed therein is not a disposable filter unit. Moreover, the filter unit disclosed in US20030189002 thus has no mechanical filter fixating/releasing unit. Furthermore, other examples are shown in EP2559668 and KR1020160053225, however these do not present filter unit which are disposable, having inflow and outflow arranged in the geometry according to the present invention, and also comprises a mechanical filter fixating/releasing unit such as according to the present invention, i.e. such as to enable a simple and effective fixation and release of the filter unit into the system.

Moreover, the disposable filter unit according to the present invention also exhibits a compact design where only small components are needed. As such, the arrangement according to the present invention is also easy to install for a person skilled in the art.

SPECIFIC EMBODIMENTS OF THE INVENTION

Below, specific embodiments of the present invention are disclosed and further explained.

According to one specific embodiment of the present invention, the inflow and outflow comprise quick release connections. This is of interest to obtain the function of a quick and simple fixating and releasing of a disposable filter unit into and from a docking unit of a system. This functionality is further improved by arranging a mechanical filter fixating/releasing unit, e.g. comprising a releasing lever, in the system. One example thereof is clearly shown in FIGS. 2 and 3.

According to yet another specific embodiment of the present invention, the filter means is enclosed entirely by the outer body, top and bottom so that outer body functions as a pressure vessel. This is a further difference when comparing the present invention with the capsule disclosed in WO2016/144235.

Some examples of materials possible to use for the outer body are polypropylene, nylon or HDPE (high-density polyethylene).

Also the size and design etc. of the filter according to the present invention may be different. One example according to the present invention is a filter having a cylinder shape. In such a case the filtration is made radial along the entire length of the cylinder. Moreover, another example is to incorporate two shorter filters on top of each other. Also in this case a radial filtration profile is of interest so cylindrical shapes of the filters are preferable.

Furthermore, the disposable filter unit according to the present invention should be possible to ventilate. This may be performed by using the inflow/outflow of the disposable filter unit. Moreover, according to one specific embodiment of the present invention, the disposable filter unit comprises one extra outflow positioned adjacent to the top, and intended for ventilating the disposable filter unit.

According to yet another embodiment of the present invention, there is provided a filter system intended for a system allowing for purification and recycling of water or separation of water, said filter system comprising a first filter being a removable mesh filter arranged to filter off rough material and second filter being a disposable filter according to the present invention. To five an example, the mesh filter may be provided to filter of rough material with a size above 70 micrometer.

A back washing function may be of interest to clean the mesh filter to prolong the durability of that filter.

Figure 5:
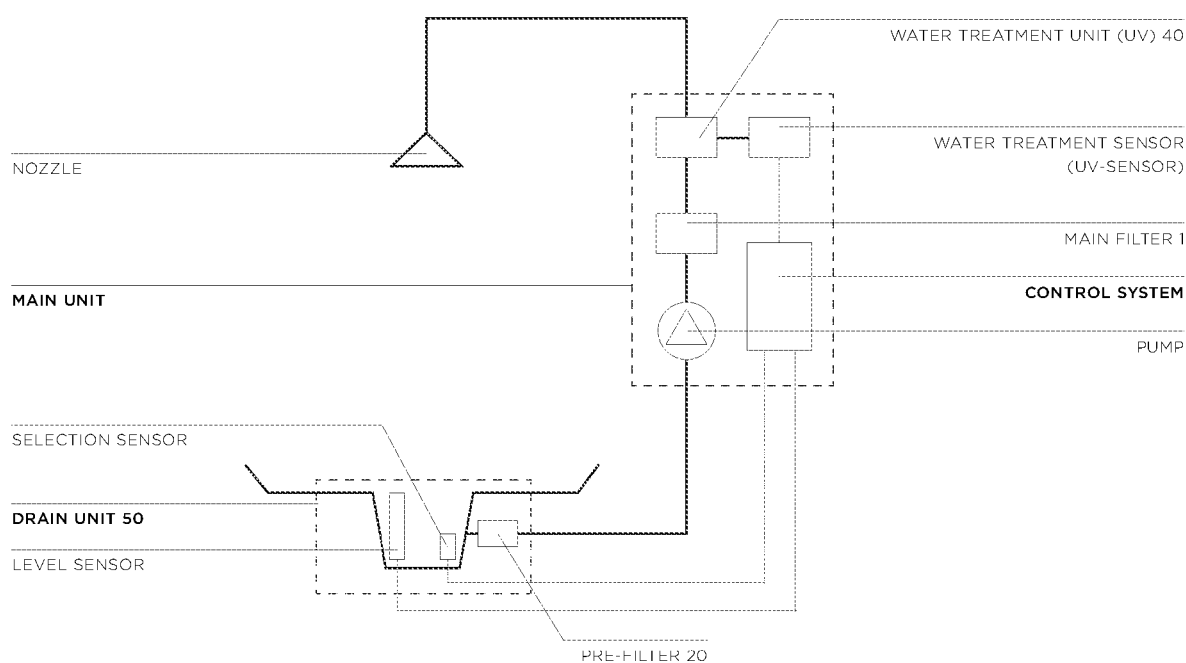
In FIG. 5 there is shown one example of a full system allowing for purification and recycling of water or separation of water comprising a filter unit (here called main filter) according to the present invention.

According to yet another embodiment, the removable mesh filter is arranged at a drain of the system, which is at or in close proximity to a point of separation of clean water for recycling and contaminated water intended to be discarded. One example thereof is shown in FIG. 5. To provide the removable mesh filter at the drain may have several advantages. A position close to the drain is the most suitable point for separation of clean water and contaminated water. Therefore, it is advantageous to arrange the mesh filter at or in close proximity to the drain. Having the mesh adjacent, just upstream of the point where separation of contaminated water takes place, dirt released from the mesh during backflushing will effectively be discharged into the drain and leave the recirculation system. This further minimizes the need for manual cleaning or replacement of the mesh/prefilter.

In relation to the above it should be noted that it is of interest to understand the meaning of the word "drain" in the context of the present invention. The word "drain" according to the present invention implies a point leading to the sewage, but in fact is not the sewage in itself. Moreover, the system according to the present invention may also comprise a unit like a recirculation tank positioned adjacent to the drain. The separation point in that case may act as the interface between the recirculation tank and the drain leading to the sewage.

According to yet another specific embodiment of the present invention the system also comprises water treatment unit. The type of water treatment unit may vary. According to one embodiment the water treatment unit is a light unit. Another example is to incorporate a water treatment unit comprising granulate. These granulates then have a disinfection function which purifies the water.

When incorporating a light unit as the water treatment unit, different form of light may be the treating medium. The light unit may be a LED unit, UV-LED unit or a conventional UV unit. Furthermore, the wavelength and colour of the light should be set to optimize for the treatment of water to purify it from contaminants.

According to one specific embodiment, the light unit is a UV unit, e.g. a UV lamp.

Furthermore, the actual water treating unit may be a combined water heater and water treatment device so that the water treatment unit is enclosed in a heater unit. One example is a device incorporating a light unit and having a heater element outside of a container incorporating the light unit. A further example is such a device also incorporating a UV light unit. Preferably such a unit then also comprise a UV sensor which at least gives an indication of the function of the UV treatment. If the light reaches the UV sensor, this is an indication that light penetrates the water flow space contained inside the water treatment unit. In the case of a UV lamp, then preferably this is surrounded by a transparent protective cover, e.g. made of a plastic or glass material, such as a quartz glass, to make sure not to contaminate the UV lamp. The space between the quartz glass and the inside wall of the single container holds the water to be treated. The UV light is intended to penetrate all of that space as effectively as possible. Therefore, it is important to make sure that the UV lamp and also the quartz glass is free from contaminants and fouling.

It may further be said that also the filter unit may comprise a light unit, such as a UV unit, as additional means. Such a light unit could improve to keep the filter unit hygiene. Other means to enable this could be microwaves and other suitable heating sources. Also ventilating the filter with air could be another alternative.

According to yet another specific embodiment of the present invention, there is disclosed a method for allowing for purification and recycling of water or separation of water in a system intended therefore, said method comprising:

a first step being selection step where clean water in accordance with a set water standard is recirculated in the system and contaminated water is separated off;

a second step being a rough filtration which is performed by use of a pre-filter;

a third step being a mid and fine filtration by use of a disposable main filter; and a fourth step being a water treatment by use of a water treatment unit;

wherein the pre-filter is back-flushed after the system has been used.

According to one specific embodiment of the present invention, the system is emptied subsequently to the pre-filter being back-flushed.

There are existing methods shown which relate to the processing and/or treatment of water. One such is disclosed in U.S. Pat. No. 5,147,532, which relates to a system for treating grey water from household appliances. The method disclosed in U.S. Pat. No. 5,147,532 does not describe using back-flushing, which is of relevance to prolong the durability of the filter unit according to the present invention. Moreover, and as is further evident from below, there are also other differences of importance when comparing the method according to the present invention with the method disclosed in U.S. Pat. No. 5,147,532. To give one example, the method according to U.S. Pat. No. 5,147,532 is not directed to a method operating in real time with regard to making a selection of recirculation and separation. In U.S. Pat. No. 5,147,532 a tank is used to store clean water which may be used in another application at another time. This is not the case according to the present invention where the method is performed in real-time, and is performed without the involvement of the user. This is not the case in the method according to U.S. Pat. No. 5,147,532 where the user is involved in the decision of when to use the clean water in the tank.

With reference to the above, according to one specific embodiment of the present invention, the method is performed continuously with multiple loops and in real-time. Moreover, and as mentioned, the method is automatic and does not need the involvement of the user in a direct way. This further implies that according to the present invention water may be looped and reused or separated off in real-time within an automated process that does not need involvement of the user.

Furthermore, according to yet another specific embodiment, the pre-filter is arranged at a unit being a recirculation tank or a drain of the system, and wherein this unit constitutes a separation point where water in accordance with a set water standard is recirculated or contaminated water is separated off. This has been further discussed above in relation to the system according to the present invention.

In relation to the expression "has been used" this implies when a user is finished with the system, such as in the case of a shower system after a shower.

The system according to the method according to the present invention comprises a filter system comprising a pre-filter and a disposable main filter, a drain, a water treatment unit, a sensor system and a control system and a pump and piping etc. The pre-filter is back-flushed to continuously prevent particles from clogging the filter medium. The pre-filter may also be temporarily removed to be manually cleaned if this is needed.

If water is separated off, as is decided in the control system based on indications form a sensor system, it is sent out from the system via the drain. Moreover, the water treatment unit may be a combined water heater and water treatment unit. Furthermore, the water treatment unit may be a UV unit, such as comprising a UV lamp.

According to yet another specific embodiment of the present invention, the disposable main filter is evacuated after the system has been used. According to yet another specific embodiment of the present invention, also the UV treatment unit is evacuated after the system has been used. This is performed so as to prolong the durability of the disposable main filter and to counteract growth on the filter.

Finally, the present invention is also directed to a method disclosed above being performed in a system according to the present invention.

DETAILED DESCRIPTION OF THE DRAWINGS

Figure 1A:
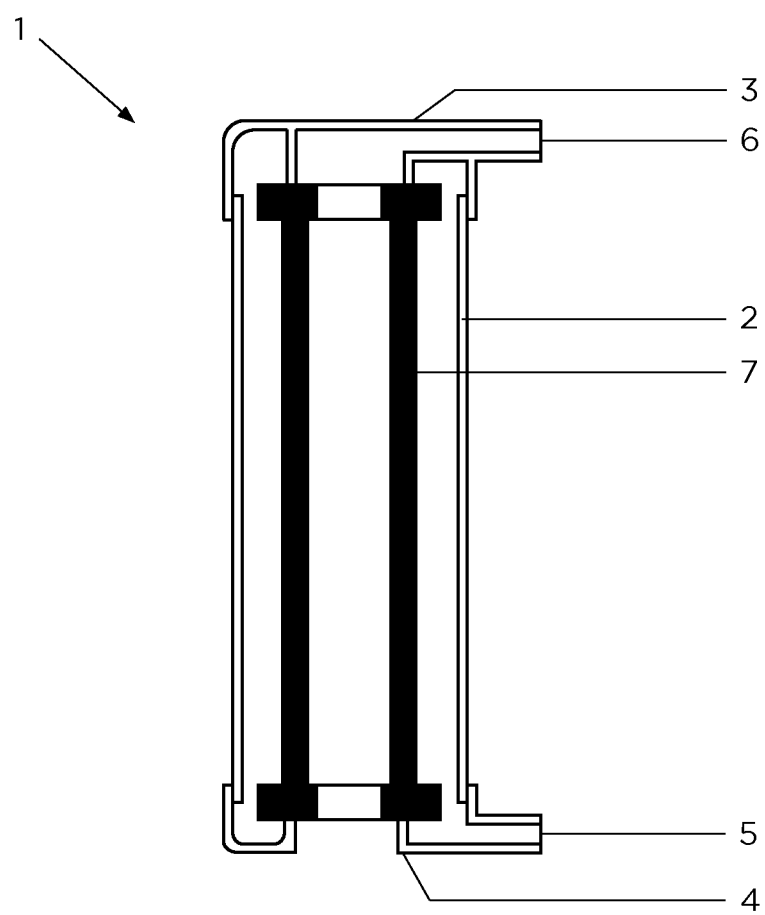
In FIG. 1A there is shown a cross section of a disposable filter unit according to one specific embodiment of the present invention.
Figure 1B:
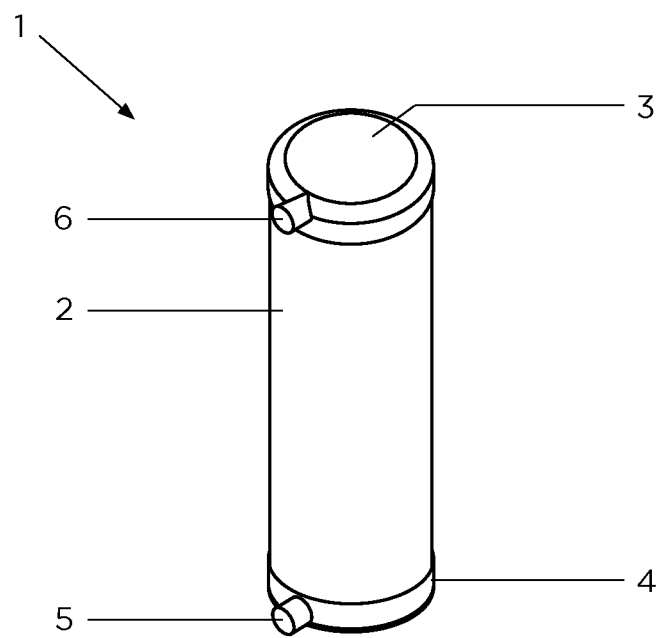
In FIG. 1B there is shown a disposable filter unit according to one embodiment of the present invention, seen from the outside.

FIG. 1A shows a cross section of a disposable filter unit 1 comprising an outer body 2, a top 3, a bottom 4, an inflow 5, an outflow 6 and a filter means 7 enclosed in the outer body. The inflow 5 is positioned adjacent to the bottom 4 and the outflow 6 is positioned adjacent to the top 3, and the inflow 5 and outflow 6 are arranged to be fixated simultaneously into a system 10 and released simultaneously from the system 10 enabling a simple replacing of the disposable filter unit 1 for a user. In FIG. 1B there is shown a disposable filter unit 1 in accordance with FIG. 1 A, however in this case seen from the outside.

Figure 2:
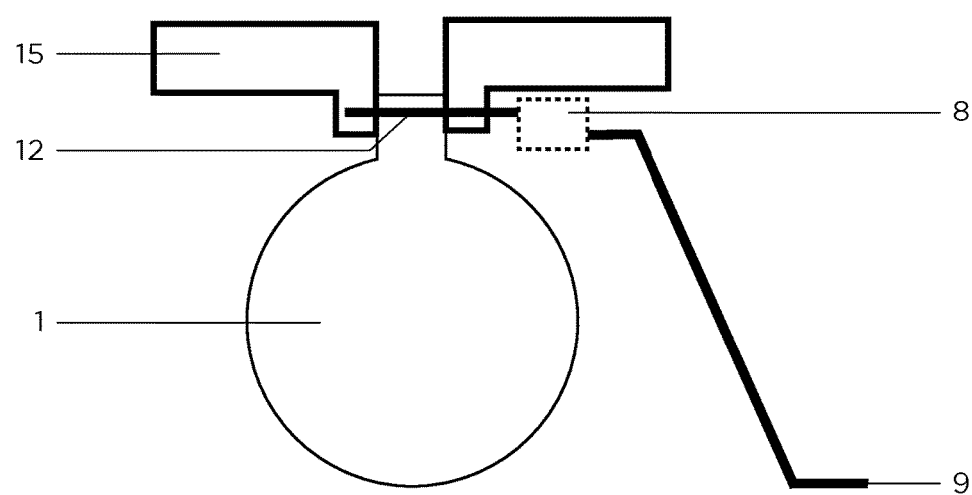
In FIG. 2 there is shown a cross section from above of a disposable filter unit according to the present invention fixated into a docking station of a system.

In FIG. 2 there is shown a cross section from above of a disposable filter unit 1 fixated into a docking station 15 of a system 10. The inflow 5 and outflow 6 comprise quick release connections 12, now when seen from above only seen as one connection. Furthermore, the system 10 comprises a mechanical filter fixating/releasing unit 8 ("release mechanism") with a release lever 9, intended to enable fixation and release of a disposable filter unit 1 into the docking station 15 of the system 10.

Figure 3:
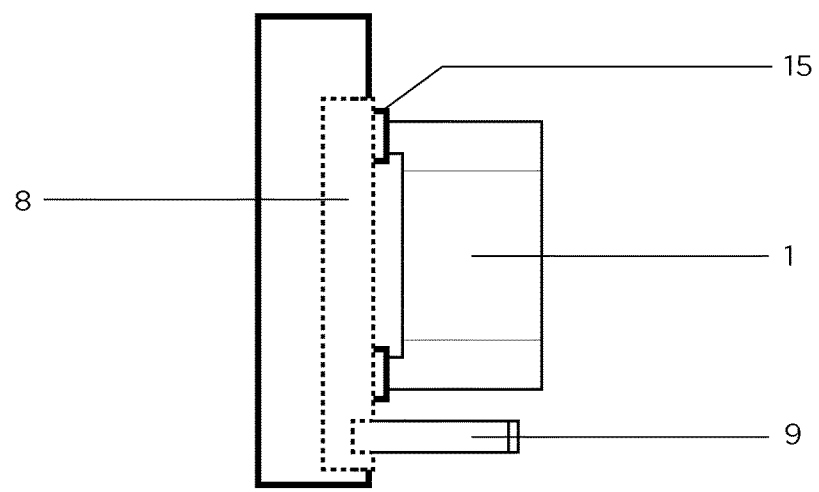
In FIG. 3 there is shown a corresponding view to the one shown in FIG. 2, but in this case with a cross section seen from the side.

Moreover, in FIG. 3 there is shown a corresponding view to the one shown in FIG. 2, but in this case with a cross section seen from the side.

Figure 4:
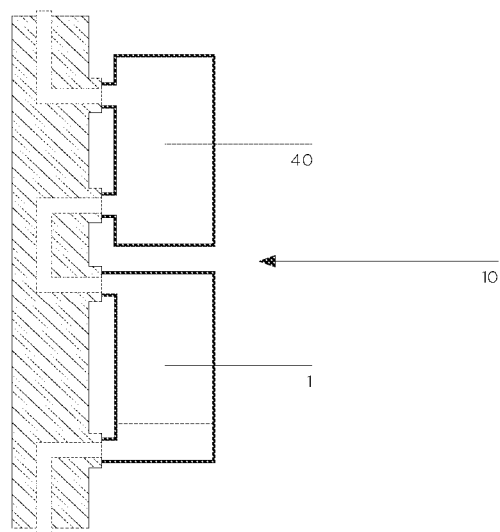
In FIG. 4 there is shown a part of a system allowing for purification and recycling of water or separation of water, wherein said system comprises a combined water heater and water treatment device which in terms of process flow is placed above a filter unit according to the present invention.

In FIG. 4 there is shown a part of a system 10 allowing for purification and recycling of water or separation of water, wherein said system comprises a combined water heater and water treatment device 40 which in terms of process flow is placed above a disposable filter unit 1 according to the present invention.

As may be understood from FIG. 4, the combined water heater and water treatment device 40 is placed in a vertically higher position than the disposable filter unit 1 the system 10. The water flow is directed to be fed into the bottom of the filter unit 1, fed through the filter unit 1 and out from the top of the same, then further into the combined heater and water treatment unit 40 at the bottom of the same to be treated and then finally after treatment fed out from the combined heater and water treatment unit 40 at the top thereof.

The vertical positioning of the disposable filter unit 1 and combined heater and water treatment unit 40 in that order has several advantages. First of all, this arrangement enables a draining cycle of the filter unit 1, and also the combined heater and water treatment unit 40, by emptying water in the system from the top to the bottom by using gravity. Secondly, such a draining of the filter unit 1 also implies that the draining is performed from a cleaner part of the filter unit 1 to a dirtier side thereof, which also is beneficial. Furthermore, when filling the system from bottom to top, then air in the system is transported the same direction. As such, there is no need to ventilate the system and there is minimal risk for air pockets.

In FIG. 5 there is shown one example of a full system 10 allowing for purification and recycling of water or separation of water comprising a disposable filter unit 1 (here called main filter) according to the present invention. In this case the system 10 is a shower. The pre-filter 20 is a mesh filter which is positioned in the drain unit 50 of the system 10. Furthermore, above the disposable filter unit 1 there is provided a water treatment unit 40, in this case a UV treatment unit. Different types of sensors and their connection to a control system are also shown in FIG. 5.

Figure 6:
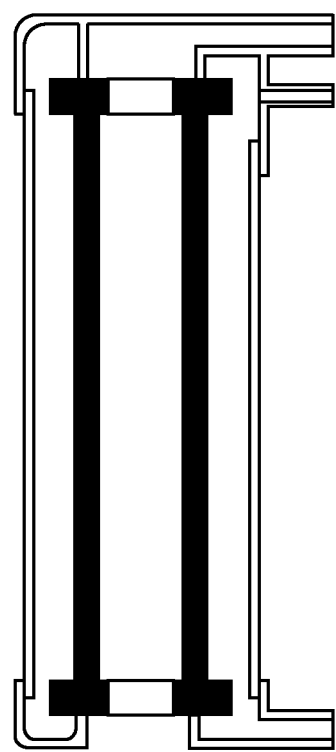
In FIG. 6 there is shown another specific embodiment of a disposable filter unit according to the present invention.

In FIG. 6 there is shown another specific embodiment of a disposable filter unit 1 according to the present invention. In this case the filter unit 1 has two outflows in the top of the filter unit. This may be of interest to incorporate a ventilation channel in the main filter, inter alia intended for evacuation.

Moreover, when the pressure is built up, such as during a showering cycle when recirculation is performed, then the ventilation channel is closed and the water is filtered and directed through the main outflow. When this is not the case then that channel is open to be used, such as for evacuation of the same. Moreover, as an open channel implies that air is not necessary to be driven through the filter for filling and draining, these two events may be performed faster. Such a ventilation channel with a check valve may be of interest to incorporate in the disposable main filter unit according to the present invention.

The invention claimed is:

1. Disposable filter unit intended for a system that comprises a water treatment UV unit including a UV lamp and a UV sensor and allowing for purification and recycling of water or separation of water, said disposable filter unit comprising an outer body, a top, a bottom, an inflow, an outflow, and a filter means enclosed in the outer body, characterized by that the disposable filter unit is arranged in a vertical direction with the top in a highest position and wherein the inflow is positioned adjacent to the bottom and the outflow is positioned adjacent to the top, and that the inflow and the outflow are arranged to be fixated simultaneously into the system and released simultaneously from the system enabling a simple replacing of the disposable filter unit for a user, and wherein the system comprises a mechanical filter fixating/releasing unit.

2. Disposable filter unit according to claim 1, wherein the inflow and the outflow comprise quick release connections.

3. Disposable filter unit according to claim 1, wherein the filter means is enclosed entirely by the outer body, the top and the bottom so that the disposable filter unit functions as a pressure vessel.

4. Disposable filter unit according to claim 1, wherein the disposable filter unit comprises one extra outflow positioned adjacent to the top and intended for ventilating the disposable filter unit.

5. Filter system intended for the system allowing for purification and recycling of water or separation of water according to claim 1, comprising a first filter being a removable mesh filter arranged to filter off rough material with a size above 70 micrometer and a second filter being the disposable filter unit.

6. Filter system allowing for purification and recycling of water or separation of water, wherein the filter system comprises the disposable filter unit according to claim 1, wherein a removable mesh filter is arranged at a drain of the filter system and is at or in close proximity to a point of separation of clean water for recycling and contaminated water intended to be discarded.

7. Filter system according to claim 6, wherein the water treatment UV unit is enclosed in a heater unit.

8. A water filtration system for purification and recycling of water or separation of water, comprising:
a disposable filter unit comprising an outer body, a top, a bottom, an inflow, an outflow and a filter means enclosed in the outer body, characterized by that the disposable filter unit is arranged in a vertical direction with the top in a highest position and wherein the inflow is positioned adjacent to the bottom and the outflow is positioned adjacent to the top, and that the inflow and the outflow are arranged to be fixated simultaneously into the water filtration system and released simultaneously from the water filtration system enabling a simple replacing of the disposable filter unit for a user;
wherein the inflow and the outflow comprise quick release connections;
a docking unit configured to position the disposable filter unit when installed in the docking unit to enable the simultaneous fixation and release of the inflow and the outflow of the disposable filter unit from the water filtration system using at least the quick release connections of the inflow and the outflow; and
a mechanical filter fixating/releasing unit configured to simultaneously fixate the inflow and the outflow of the disposable filter unit in the docking unit and to simultaneously release the inflow and the outflow of the disposable filter unit from the docking unit.

9. The water filtration system of claim 8, further comprising:
a lever configured to enable the fixating and releasing of the mechanical filter fixating/releasing unit.

10. The water filtration system of claim 8, wherein the disposable filter unit is arranged in the water filtration system in the vertical direction with the top in the highest position of the water filtration system.

11. The water filtration system of claim 8, wherein the disposable filter unit comprises one extra outflow positioned adjacent to the top and intended for ventilating the disposable filter unit.

12. The water filtration system of claim 8, further comprising a pre-filter before the disposable filter unit, the pre-filter including a removable mesh filter arranged to filter off rough material with a size above 70 micrometers.

13. The water filtration system of claim 8, further comprising the water treatment UV unit.

14. The water filtration system of claim 13, wherein the water treatment UV unit is a UV unit including a UV lamp and a UV sensor.

15. Disposable filter unit intended for a system allowing for purification and recycling of water or separation of water, said disposable filter unit comprising an outer body, a top, a bottom, an inflow, an outflow, a filter means enclosed in the outer body, and a water treatment UV unit including a UV lamp and a UV sensor, characterized by that the disposable filter unit is arranged in a vertical direction with the top in a highest position and wherein the inflow is positioned adjacent to the bottom and the outflow is positioned adjacent to the top, and that the inflow and the outflow are arranged to be fixated simultaneously into the system and released simultaneously from the system enabling a simple replacing of the disposable filter unit for a user, and wherein the system comprises a mechanical filter fixating/releasing unit.

16. Disposable filter unit according to claim 15, wherein the inflow and the outflow comprise quick release connections.

17. Disposable filter unit according to claim 15, wherein the filter means is enclosed entirely by the outer body, the top and the bottom so that the disposable filter unit functions as a pressure vessel.

18. Disposable filter unit according to claim 15, wherein the disposable filter unit comprises one extra outflow positioned adjacent to the top and intended for ventilating the disposable filter unit.

19. Filter system intended for the system allowing for purification and recycling of water or separation of water according to claim 15, comprising a first filter being a removable mesh filter arranged to filter off rough material with a size above 70 micrometer and a second filter being the disposable filter unit.

20. Filter system allowing for purification and recycling of water or separation of water, wherein the filter system comprises the disposable filter unit according to claim 15, wherein a removable mesh filter is arranged at a drain of the filter system and is at or in close proximity to a point of separation of clean water for recycling and contaminated water intended to be discarded.

21. Filter system according to claim 20, wherein the water treatment UV unit is enclosed in a heater unit.

* * * * *